United States Patent
Ogden et al.

(10) Patent No.: US 11,808,934 B2
(45) Date of Patent: Nov. 7, 2023

(54) PLANAR OPTICAL TELESCOPE AND RELATED METHODS

(71) Applicant: EAGLE TECHNOLOGY, LLC, Melbourne, FL (US)

(72) Inventors: Chad Elliott Ogden, Carlsbad, CA (US); Jonathan Tyler Nagy, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 227 days.

(21) Appl. No.: 17/235,122

(22) Filed: Apr. 20, 2021

(65) Prior Publication Data

US 2022/0334373 A1 Oct. 20, 2022

(51) Int. Cl.
*G02B 6/00* (2006.01)
*G02B 23/00* (2006.01)
*G02B 3/00* (2006.01)
*G02B 6/28* (2006.01)
*G02B 17/02* (2006.01)
(Continued)

(52) U.S. Cl.
CPC ........... *G02B 23/00* (2013.01); *G02B 3/0006* (2013.01); *G02B 6/12* (2013.01); *G02B 6/2808* (2013.01); *G02B 6/4201* (2013.01); *G02B 17/023* (2013.01); *G02B 27/0081* (2013.01); *H04N 23/54* (2023.01); *H04N 23/55* (2023.01); *G02B 2006/12135* (2013.01)

(58) Field of Classification Search
CPC ........ G02B 23/00; G02B 3/0006; G02B 6/12; G02B 6/2808; G02B 6/4201; G02B 17/023; G02B 27/0081; G02B 2006/12135; G02B 1/005; G02B 3/0056; H04N 23/54; H04N 23/55
See application file for complete search history.

(56) References Cited

U.S. PATENT DOCUMENTS 5,189,494 A * 2/1993 Muraki ................. G03F 9/7049
250/237 G
5,716,889 A * 2/1998 Tsuji ..................... H01L 23/544
257/E23.179

(Continued)

FOREIGN PATENT DOCUMENTS

| CN | 110954966 | 4/2020 |
| CN | 111025671 | 4/2020 |

(Continued)

OTHER PUBLICATIONS

Hailu et al. Tunable Optical Delay Line Based on a Racetrack Resonator with Tunable Coupling and Stable Wavelength. Appl. Sci. 2019, 9, 5483.*

(Continued)

*Primary Examiner* — Frank F Huang
(74) *Attorney, Agent, or Firm* — ALLEN, DYER, DOPPELT, + GILCHRIST, P.A.

(57) ABSTRACT

An optical telescope may include an array of optical lenslets in a common plane, and optical waveguides extending from respective optical lenslets and each having a common optical path delay. Further, at least one optical star coupler may be downstream from the optical waveguides, and an optical detector may be downstream from the at least one optical star coupler and having an optical image formed thereon.

15 Claims, 7 Drawing Sheets

(51) Int. Cl.
*G02B 6/12* (2006.01)
*G02B 27/00* (2006.01)
*G02B 6/42* (2006.01)
*H04N 23/54* (2023.01)
*H04N 23/55* (2023.01)

(56) References Cited

U.S. PATENT DOCUMENTS

| | | | |
|---|---|---|---|
| 6,628,355 B1 * | 9/2003 | Takahara | H04N 9/3167 349/86 |
| 7,095,925 B2 | 8/2006 | Grunnet-Jepson et al. | |
| 7,099,264 B2 | 8/2006 | Fukaya et al. | |
| 7,525,081 B2 | 4/2009 | Toyoda et al. | |
| 7,976,208 B2 | 7/2011 | Travis | |
| 8,913,859 B1 * | 12/2014 | Duncan | G02B 27/50 356/477 |
| 9,154,253 B2 | 10/2015 | Swanson et al. | |
| 9,261,656 B2 | 2/2016 | Qi et al. | |
| 9,754,985 B1 | 9/2017 | Duncan et al. | |
| 9,860,443 B2 | 1/2018 | Ford et al. | |
| 10,012,827 B1 * | 7/2018 | Duncan | G02B 23/00 |
| 10,191,145 B2 | 1/2019 | Swanson | |
| 10,256,537 B2 | 4/2019 | Besoli et al. | |
| 10,302,409 B1 * | 5/2019 | Duncan | G01B 9/02038 |
| 10,317,624 B1 | 6/2019 | Ogden et al. | |
| 10,365,536 B1 | 7/2019 | Jenkins et al. | |
| 10,545,289 B1 | 1/2020 | Chriqui et al. | |
| 10,564,373 B1 * | 2/2020 | Ogden | G02B 6/425 |
| 10,594,935 B2 | 3/2020 | Wheeler et al. | |
| 10,663,282 B1 * | 5/2020 | Ogden | G01H 9/004 |
| 11,099,297 B1 * | 8/2021 | Hurlburt | G01W 1/10 |
| 11,102,426 B1 * | 8/2021 | Kendrick | H04N 23/56 |
| 11,159,234 B1 * | 10/2021 | Chriqui | G01S 17/34 |
| 2006/0012872 A1 * | 1/2006 | Hayashi | G02B 21/0076 359/371 |
| 2007/0156379 A1 * | 7/2007 | Kulkarni | H01L 21/67005 703/14 |
| 2015/0103229 A1 * | 4/2015 | Nozawa | G02B 27/1013 348/342 |
| 2016/0320629 A1 * | 11/2016 | Leonberger | G02B 3/0056 |
| 2019/0052776 A1 * | 2/2019 | Kawano | H01L 27/14623 |

FOREIGN PATENT DOCUMENTS

| | | |
|---|---|---|
| DE | 102009049387 | 4/2021 |
| WO | WO2012117733 | 7/2014 |

OTHER PUBLICATIONS

Kendrick et al., "Flat-panel space-based space surveillance sensor." Advanced Maui Optical and Space Surveillance Technologies (AMOS) Conference. 2013.*

White et al. "A Silicon Photonics Computational Lensless Active-Flat-Optics Imaging System" www.nature.com/scientificreports; https://www.nature.com/articles/s41598-020-58027-1#Sec1; p. 9.

* cited by examiner

PLANAR OPTICAL TELESCOPE AND RELATED METHODS

TECHNICAL FIELD

The present disclosure relates to imaging system, and, more particularly, to optical telescope systems and related methods.

BACKGROUND

High-resolution remote imaging applications may require large aperture diameters to see fine details. However, traditional telescopes have large size, weight, and power (SWaP), with a telescope of diameter D occupying a volume of at least $D^3$. For space-based imaging systems, telescope SWaP drives the cost to launch. Similarly, for a telescope fielded on an Unmanned Aerial System (UAS), SWaP limits the maximum resolution that may be used.

Conventional telescopes utilize multiple lenses or mirrors along a relatively long image path, which provides high resolution but a very large SWaP. An alternative approach is a photon sieve, in which interference of all the apertures creates the focused image. However, photon sieves may also require a relatively long propagation distance to form an image, and may therefore be limited in terms of SWaP. Still another approach is metamaterial lenses, which impart phase on an incoming wavefront, causing it to focus. Here again, they also require a relatively long propagation distance to form an image, and generally do not allow for the ability to impart sufficient delay to work in broadband as lens size grows.

As a result, various other approaches have been developed. U.S. Pat. No. 8,913,859 to Duncan et al. discloses a device for interferometric imaging that includes multiple optical elements arranged in a linear configuration. The device also includes multiple waveguide arrays (WGAs), and each WGA of the multiple WGAs may include one or more waveguides (WGs). Some of the WGs of each WGA of the multiple WGAs may be optically coupled to an optical element of the multiple optical elements. Each WG of a first WGA of the multiple WGAs is coupled to a first optical element of the multiple optical elements and is paired with a WG of a second WGA of the multiple WGAs that is coupled to second optical element of the multiple optical elements. The lengths of the paired WGs of the first and second WGAs of the multiple WGAs are not equal.

Despite the existence of such systems, further advancements in optical telescopes may be desirable, such as for remote imaging applications.

SUMMARY

An optical telescope may include an array of optical lenslets in a common plane, and a plurality of optical waveguides extending from respective optical lenslets and each having a common optical path delay. Further, at least one optical star coupler may be downstream from the plurality of optical waveguides, and an optical detector may be downstream from the at least one optical star coupler and having an optical image formed thereon.

In accordance with one example embodiment, the optical telescope may further include a plurality of delay elements associated with respective optical waveguides. By way of example, the plurality of delay elements may comprise a plurality of heaters.

The optical telescope may further include a first photonic layer having the array of optical lenslets therein, and a second photonic layer having the plurality of optical waveguides therein. By way of example, the second photonic layer may comprise a photonic integrated circuit (PIC) layer and include a plurality of delay elements associated with respective optical waveguides. In accordance with another example implementation, the optical telescope may include a third photonic layer having the at least one optical star coupler therein. Moreover, the optical telescope may also include a fourth photonic layer having the optical detector therein.

In an example configuration, the optical telescope may also include a first photonic layer having the array of lenslets therein arranged in rows and columns, a second photonic layer having a set of optical star couplers from the plurality of optical star couplers for the rows, and a third photonic layer having a set of optical star couplers from the plurality of optical star couplers for the columns. In an example embodiment, the second and third photonic layers may be vertically arranged. In accordance with another example implementation, the second and third photonic layers may be horizontally arranged. In a still further example, the optical telescope may include a fourth photonic layer having the optical detector therein.

A related method for making an optical telescope may include forming an array of optical lenslets in a common plane, and forming a plurality of optical waveguides extending from respective optical lenslets and each having a common optical path delay. The method may also include forming at least one optical star coupler downstream from the plurality of optical waveguides, and forming an optical detector downstream from the at least one optical star coupler and having an optical image formed thereon.

DETAILED DESCRIPTION

The present description is made with reference to the accompanying drawings, in which exemplary embodiments are shown. However, many different embodiments may be used, and thus the description should not be construed as limited to the particular embodiments set forth herein.

Rather, these embodiments are provided so that this disclosure will be thorough and complete. Like numbers refer to like elements throughout.

Figure 1:
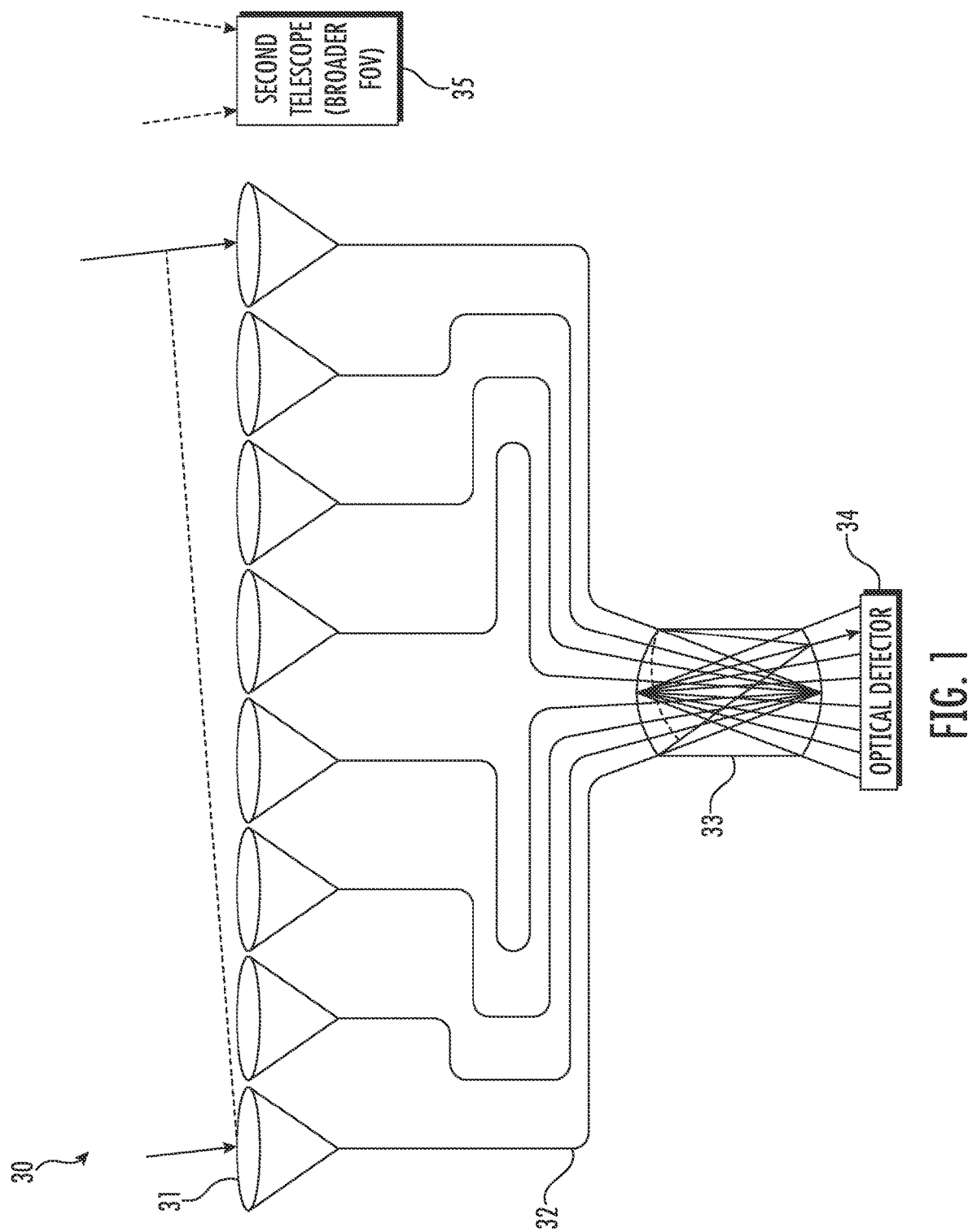
FIG. 1 is a schematic block diagram of an optical telescope including a star coupler in accordance with an example embodiment.

Referring initially to FIG. 1 a planar optical telescope 30 illustratively includes an array of optical lenslets 31 in a common plane, and a plurality of optical waveguides 32 extending from respective optical lenslets and each having a common optical path delay. Further, an optical star coupler 33 is downstream from the plurality of optical waveguides 32, and an optical detector 34 is downstream from the star optical coupler at which an optical image is formed thereon. Because the optical telescope 30 has a narrow field of view (FOV), a second telescope 35 with a broader FOV may be used in conjunction with the planar telescope, such as to assist pointing of the planar telescope.

By way of example, the lenslets 31 may be fused silica, and may be formed as a laser-written array, such as with a femtosecond laser, for example. The waveguides 32 may be silicon nitride surrounded by fused silica, and may also be laser-written with a femtosecond laser, for example. Further details regarding femtosecond laser-written waveguides and optical components may be found in U.S. Pat. No. 10,365, 536 to Jenkins et al., which is also assigned to the present Applicant and is hereby incorporated herein in its entirety by reference.

In the illustrated example, the star coupler 33 is used as a lens. Generally speaking, a star coupler is an array of waveguides that open onto a slab waveguide with waveguides all being the same radius away from the center of the output waveguides, such that light focuses on the center output waveguide when phase is equal across the input array, and light coming into the array at an angle has a laterally displaced focus, as shown. As noted above, the path lengths of the waveguides 32 may be set to provide a common optical path delay (i.e., a static delay) so that light received by the lenslets 31 reaches the star coupler 33 in phase. This, in turn, allows an image to form on the back surface of the star coupler for detection by an optical detector 34.

Figure 2:
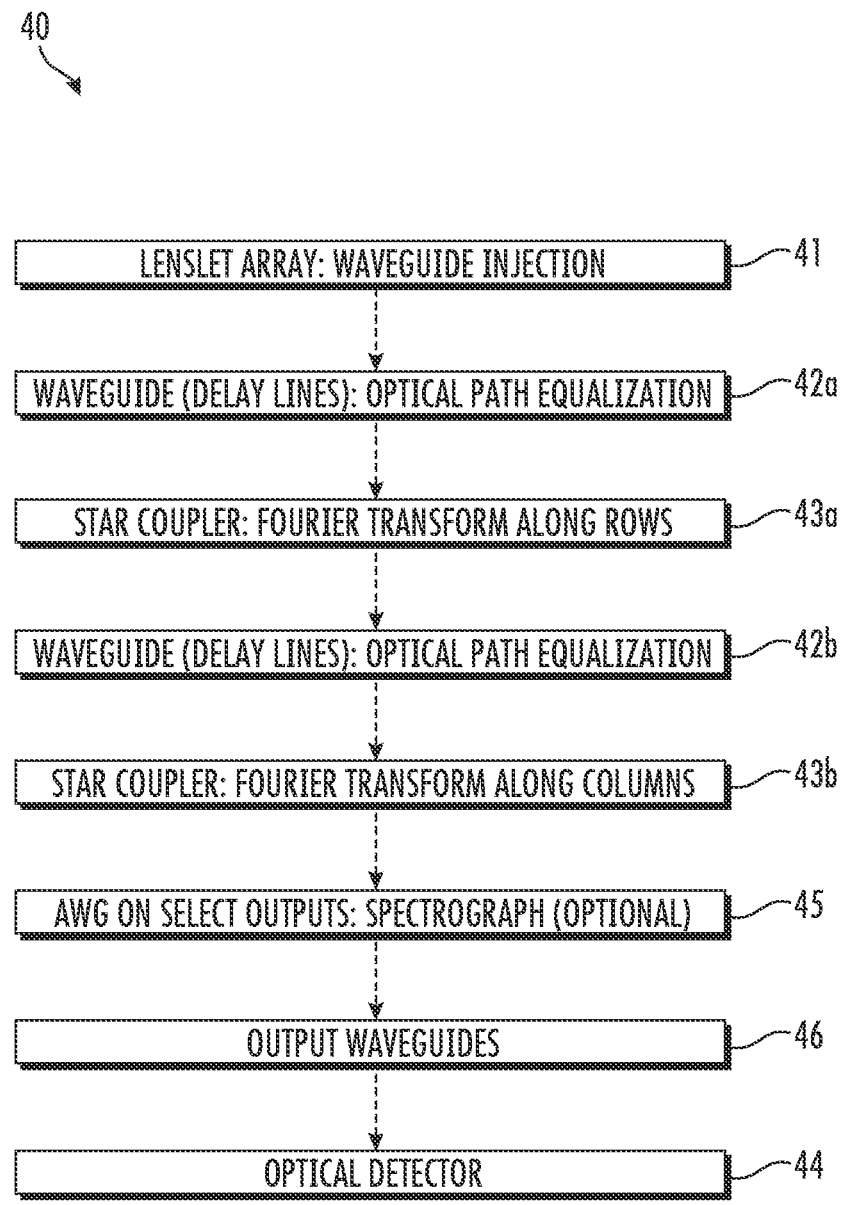
FIG. 2 is a schematic block diagram of another example optical telescope configuration in which an image is formed on two axes by chaining a 1D lens along rows and then columns.

Another example embodiment of an optical telescope 40 including multiple star couplers is shown in FIG. 2. In this example, the image is formed along two dimensions by chaining a one-dimensional (1D) array of lenses along rows, then columns (or vice versa). This is because a two-dimensional (2D) Fourier transform (2D lens) is equivalent to a 1D transform (star coupler) along rows, then columns. More particularly, downstream from the lenses 41 is a first set of waveguides (delay lines) 42a similar to those discussed above which provide optical path equalization, followed by a first star coupler 43a providing a Fourier transform along rows. Another set of waveguides (delays lines) 42b (which are similar to those discussed above and also provide optical path equalization) connects the output of the first star coupler 43a to the input of a second star coupler 43b. The second star coupler 43b provides a Fourier transform along rows. This provides a two-axis lens that can be built from one-axis star couplers 43a, 43b along each axis.

In the illustrated example, an optional arrayed waveguide grating (AWG) spectrograph 45 is connected to one or more outputs of the second star coupler 43b for hyperspectral imaging. The AWG spectrograph 45 is followed by output waveguides 46 and an optical detector 44. The output waveguides 46 may advantageously couple straight to a conventional two-axis detector. As will be discussed further below, the waveguide (delay lines) 42a and/or 42b may be implemented with heaters for fine tuning and adaptive optics in some embodiments.

Figure 3:
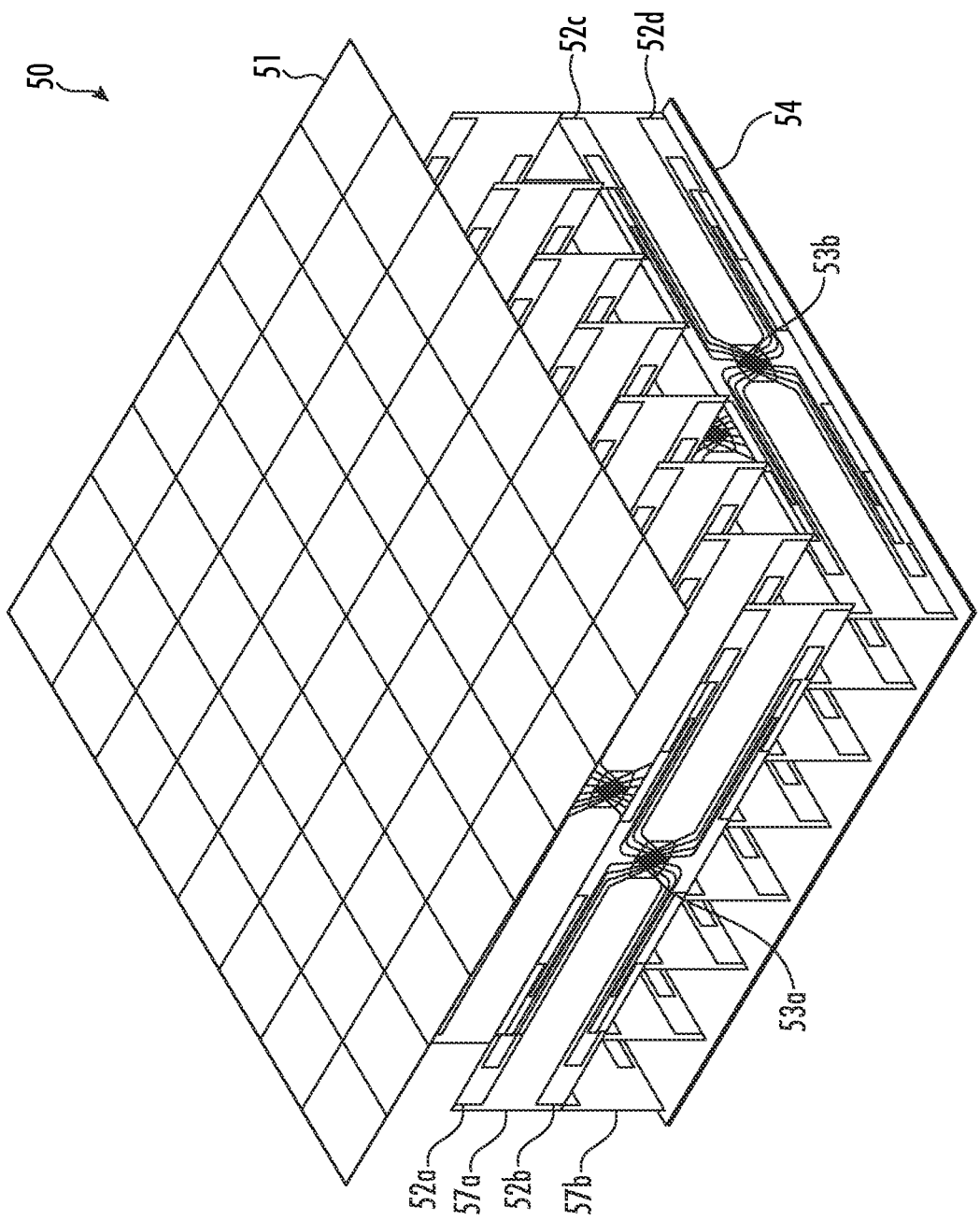
FIG. 3 is a partially exploded view of still another example optical telescope configuration utilizing a plurality of in-plane photonic integrated circuits (PICs).

Turning to FIG. 3, another similar example embodiment of an optical telescope 50 which utilizes multiple in-plane photonic integrated circuits (PICs) is now described. An array of lenslets 51 is coupled to an array of row PICs 57a each including a respective star coupler 53a, followed by an array of column PICs 57b each including a respective star coupler 53b, and an optical detector array 54. The 2D array of lenslets 51 focuses light onto input waveguides 52a at the row PIC 57a edges, with there being one PIC edge along each lenslet row. Row PIC 57a output waveguides 52b are coupled to input waveguides 52c of respective column PICs 57b along each lenslet column at an edge thereof, and column PICs output waveguides 52d couple to a 2D axis detector array 54. An advantage of this configuration is that it is buildable with single layer pics, providing a relatively low PIC fab risk.

Figure 4:
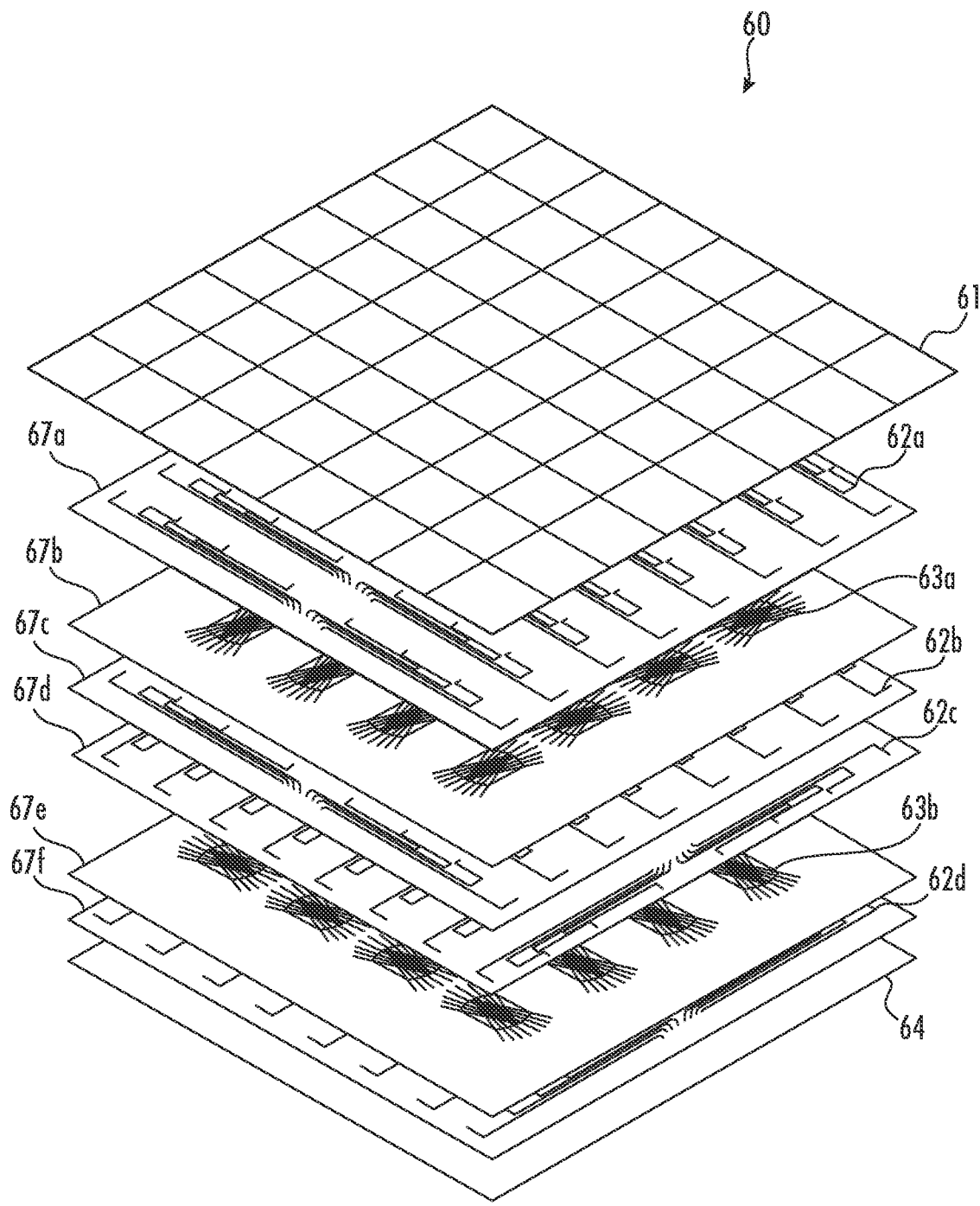
FIG. 4 is an exploded view of yet another optical telescope including PICs with out-of-plane couplers in accordance with an example implementation.

Still another example embodiment of an optical telescope 60 utilizing PICs with out-of-plane couplers is now described with reference to FIG. 4. In the illustrated configuration, delay and coupler layers 67a-67f are stacked on a single PIC. A 2D array of lenslets 61 focuses light into waveguides 62a in the first layer 67a. Outputs of the waveguides are coupled to row star couplers 63a in the second layer 67b. The third layer 67c includes waveguides 62b, which in addition to providing appropriate static delay also provide row-to-grid sorting, followed by the fourth layer 67d including waveguides 62c providing appropriate delay as well as grid-to-column sorting. Column star couplers 63b in the fifth layer 67e are downstream from the waveguides 62c, followed by waveguides 62d in the sixth layer 67f, which provide column sorting to an optical detector 64. In this configuration, the star couplers 63a, 63b are laid out in a grid pattern to provide enhanced efficiency and to maximize the number of channels. This configuration may advantageously provide a single, multi-layer PIC arrangement with relatively easy alignment and a relatively thin profile.

Figure 5:
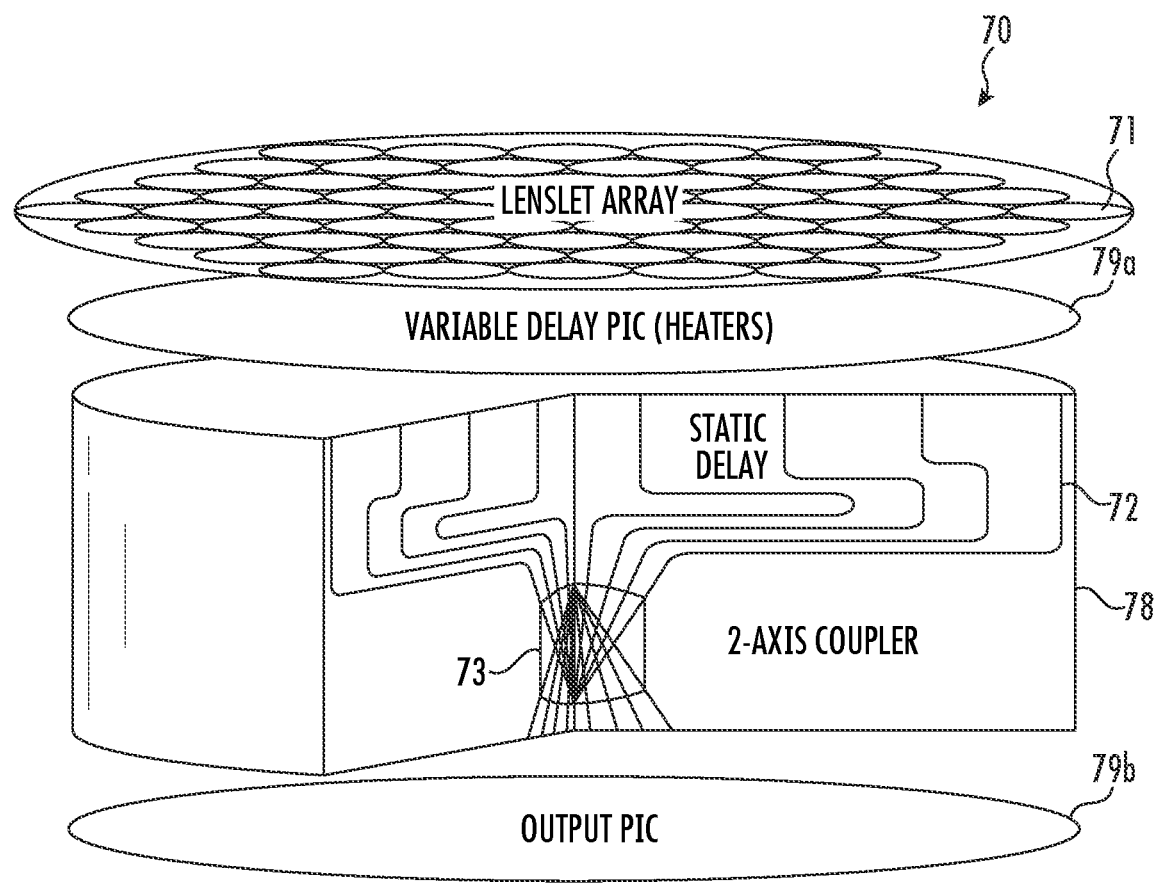
FIG. 5 is a schematic block diagram of another optical telescope including laser-written 3D waveguide delay lines.

Another example embodiment of an optical telescope 70 which incorporates laser-written 3D waveguide/delay lines 72 is now described with reference to FIG. 5. The optical telescope illustratively includes an array of lenslets 71, followed by a PIC layer 79a including out-of-plane couplers and resistive heaters to provide an adjustable delay to each waveguide 72. The variable delay elements may be coupled to a controller (not shown) which measures phase differences across pairs of waveguides 72, and controls the delay elements appropriately to provide phase alignment. As discussed further above, the waveguides 72 are configured to have path lengths that introduce a common optical path delay. In this manner, the variable delay elements provide fine or granular phase adjustment, on top of the waveguide (static delay lines) 72.

The waveguides 72 may be written with a femtosecond laser, for example, as discussed further above. In the present example, the waveguides 72 and star coupler 73 are formed in a layer 78 of optical material (e.g., fused silica). Moreover, the star coupler 73 is a two-axis star coupler, which works on the same geometry in 3D space as a one-axis star coupler works on a plane. Despite having a single star coupler 73, the illustrated configuration allows for a relatively large number of output pixels, as well as relatively short optical paths. The waveguides 72 may be stacked from a given lenslet 71 focal length into their own delay PIC layer 79a, and the waveguides 72 may be configured to "spiral" in/out to avoid tight bends. In some configurations, the star coupler may be positioned on its side help to minimize layer 78 thickness, if desired.

Figure 6:
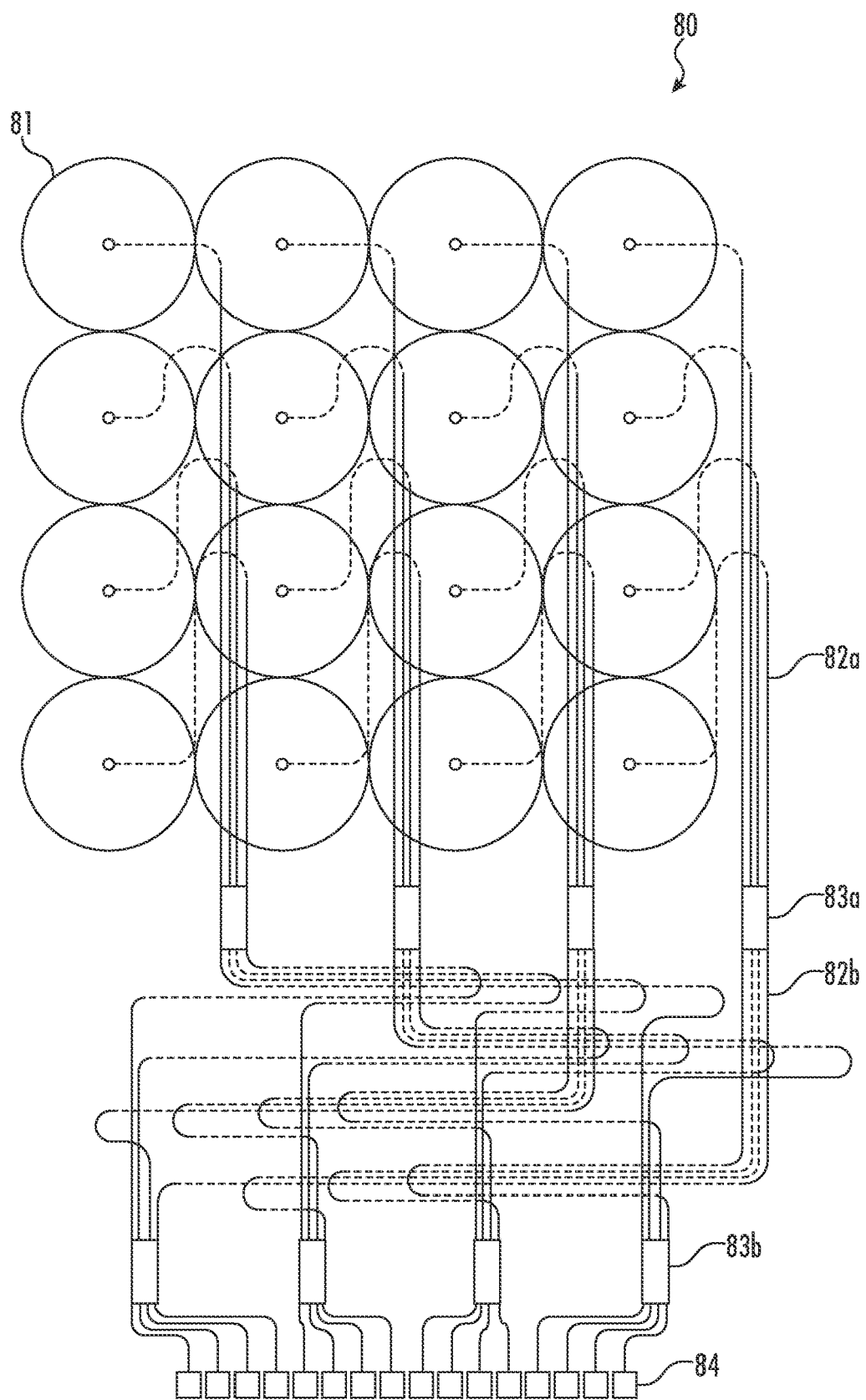
FIG. 6 is a schematic block diagram of an optical telescope in accordance with an example embodiment utilizing a two-layer PIC configuration.

Turning to FIG. 6, another example embodiment of an optical telescope 80 which may be implemented using a two-layer PIC configuration is now described. In the illustrated example, solid lines correspond to the first (top) PIC layer, and dashed lines correspond to a second (bottom) PIC layer. An array of lenslets 81 are coupled to waveguides (delay lines) 82a. Downstream from the waveguides 82a are column star couplers 83a, followed by waveguides 82b, row star couplers 83b, and optical detectors.

Figure 7:
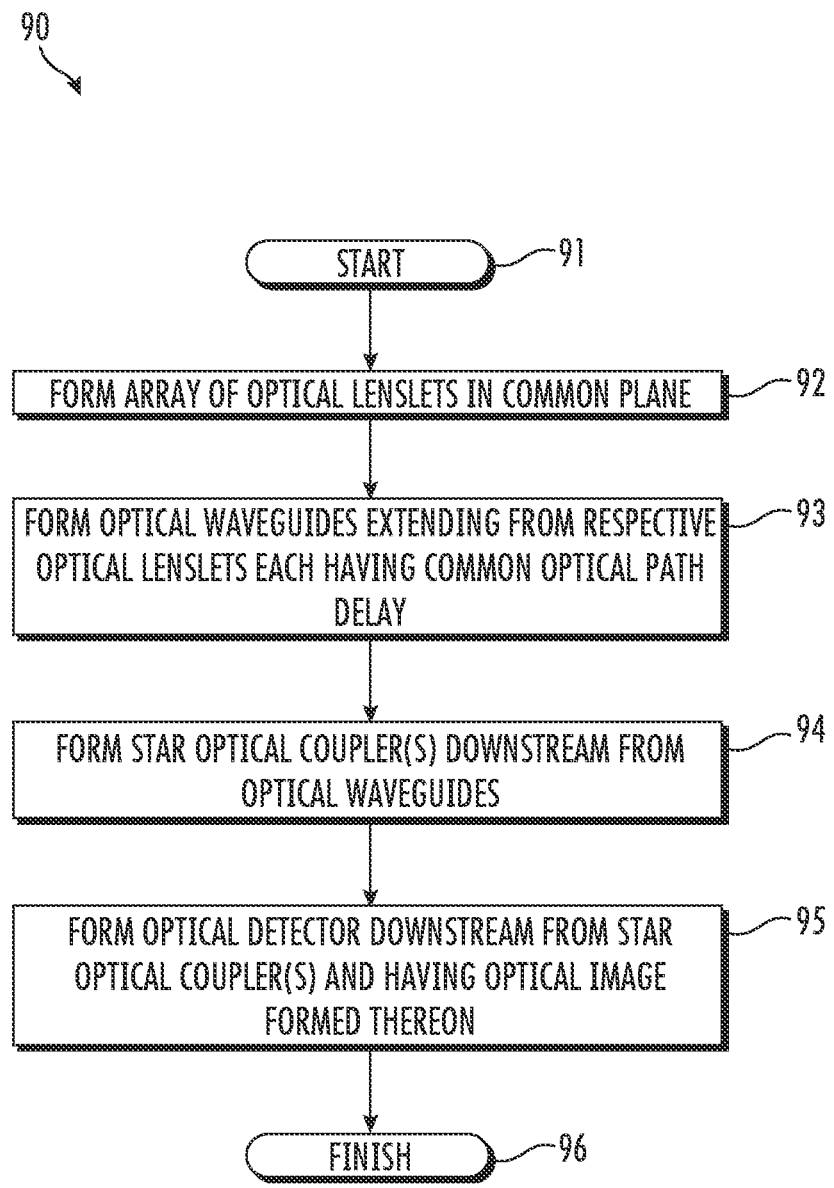
FIG. 7 is a flow diagram of an example method for fabricating an optical telescope.

A related method for making optical telescopes such as those discussed above is now described with reference to the flow diagram 90 of FIG. 7. Beginning at Block 91, the method illustratively includes forming an array of optical lenslets 31 in a common plane, at Block 92, and forming a plurality of optical waveguides 32 extending from respective optical lenslets and each having a common optical path delay, at Block 93. The method also illustratively includes forming at least one optical star coupler 33 downstream from the plurality of optical waveguides 32, and forming an optical detector 34 downstream from the at least one optical star coupler and having an optical image formed thereon (Block 95), as discussed further above. The method of FIG. 7 illustratively concludes at Block 96.

The above-described configurations advantageously allow the telescope to collapse in thickness down to a relatively flat panel, in exchange for a somewhat narrower field of view compared to a conventional telescope. However, this package replaces the focal length of a conventional telescope with a star coupler built into a substrate, which opens up the possibility for flat panel configurations with steerable high magnification imaging in a small form factor (SWaP), such as on a drone or even a handheld platform.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. An optical telescope comprising:
   a first photonic layer comprising an array of optical lenslets in a common plane and arranged in rows and columns;
   a plurality of second photonic layers each having an edge coupled to a respective row of optical lenslets, each second photonic layer comprising
      a plurality of row optical waveguides extending from the respective row of optical lenslets, the plurality of optical waveguides having a common optical path delay, and
      at least one row optical star coupler downstream from the plurality of row optical waveguides;
   a plurality of third photonic layers each having an edge coupled to a respective column of optical lenslets, each third photonic layer comprising
      a plurality of column optical waveguides extending from the respective column of optical lenslets, the plurality of column optical waveguides having a common optical path delay, and
      at least one column optical star coupler downstream from the plurality of column optical waveguides; and
   an optical detector downstream from the row and column optical star couplers and having an optical image formed thereon.

2. The optical telescope of claim 1 further comprising a plurality of delay elements associated with respective row and column optical waveguides.

3. The optical telescope of claim 2 wherein the plurality of delay elements comprises a plurality of heaters.

4. The optical telescope of claim 2 wherein the plurality of delay elements are included within an integrated circuit.

5. The optical telescope of claim 1 comprising a fourth photonic layer having the optical detector therein.

6. The optical telescope of claim 1 wherein the plurality of second and third photonic layers are vertically arranged.

7. An optical telescope assembly comprising:
   a first optical telescope comprising
      a first photonic layer comprising an array of optical lenslets in a common plane and arranged in rows and columns,
      a plurality of second photonic layers each having an edge coupled to a respective row of optical lenslets, each second photonic layer comprising
         a plurality of row optical waveguides extending from respective rows of optical lenslets, the plurality of row optical waveguides having a common optical path delay,
         at least one row optical star coupler downstream from the plurality of row optical waveguides;
      a plurality of third photonic layers each having an edge coupled to a respective column of optical lenslets, each third photonic layer comprising
         a plurality of column optical waveguides extending from the respective column of optical lenslets, the plurality of column optical waveguides having a common optical path delay, and
         at least one column optical star coupler downstream from the plurality of column optical waveguides;
      an optical detector downstream from the row and column optical star couplers at and having an optical image formed thereon; and
   a second optical telescope adjacent the first optical telescope and having a broader field of view than the first optical telescope.

8. The optical telescope assembly of claim 7 wherein the first optical telescope comprises a plurality of delay elements associated with respective row and column optical waveguides.

9. The optical telescope assembly of claim 8 wherein the plurality of delay elements comprises a plurality of heaters.

10. The optical telescope assembly of claim 7 wherein the first optical telescope comprises a fourth photonic layer having the optical detector therein.

11. A method for making an optical telescope comprising:
    forming a first photonic layer comprising an array of optical lenslets in a common plane and arranged in rows and columns;
    forming a plurality of second photonic layers each having an edge coupled to a respective row of optical lenslets, each second photonic layer comprising
       a plurality of row optical waveguides extending from respective rows of optical lenslets, the plurality of row optical waveguides having a common optical path delay, and
       at least one row optical star coupler downstream from the plurality of row optical waveguides;
    forming a plurality of third photonic layers each having an edge coupled to a respective column of optical lenslets, each third photonic layer comprising
       a plurality of column optical waveguides extending from the respective column of optical lenslets, the plurality of column optical waveguides having a common optical path delay, and at least one column optical star coupler downstream from the plurality of column optical waveguides; and forming an optical detector downstream from the row and column optical star couplers and having an optical image formed thereon.

12. The method of claim 11 comprising forming a plurality of delay elements associated with respective row and column optical waveguides.

13. The method of claim 12 wherein the plurality of delay elements comprises a plurality of heaters.

14. The method of claim 11 comprising forming a fourth photonic layer having the optical detector therein.

15. The method of claim 11 wherein the plurality of second and third photonic layers are vertically arranged.

* * * * *